United States Patent [19]

Johnson et al.

[11] 3,901,847

[45] Aug. 26, 1975

[54] FLAME RETARDANT POLYMER COMPOSITION

[75] Inventors: Burnett H. Johnson, Baytown, Tex.; Edward F. Johnson, Towa City, Iowa

[73] Assignee: Exxon Research and Engineering Company, Linden, N.J.

[22] Filed: Feb. 4, 1974

[21] Appl. No.: 439,179

Related U.S. Application Data

[63] Continuation of Ser. No. 284,321, Aug. 28, 1972, abandoned.

[52] U.S. Cl. 260/45.7 PS; 260/45.7 P; 260/77.5 R; 260/77.5 CH; 260/77.5 SS; 260/858
[51] Int. Cl. C09k 3/28
[58] Field of Search 260/45.7 P, 45.7 PS

[56] References Cited
UNITED STATES PATENTS

| 2,572,076 | 10/1951 | Fon Toy | 260/61 |
| 3,334,154 | 8/1967 | Kim | 260/860 |
| 3,557,053 | 1/1971 | Miller | 260/45.7 |
| 3,635,895 | 1/1972 | Kramer | 260/47 |
| 3,658,634 | 4/1972 | Yanagi et al. | 161/175 |
| 3,661,859 | 5/1972 | Patton | 260/77.5 |
| 3,666,401 | 5/1972 | Cahill et al. | 8/116.2 |
| 3,689,602 | 9/1972 | Ismail | 260/936 |
| 3,719,727 | 3/1973 | Masai et al. | 260/860 |

OTHER PUBLICATIONS

Hilado, "Flammability Handbook for Plastics," 1969, pg. 85.

Primary Examiner—Donald E. Czaja
Assistant Examiner—R. A. White
Attorney, Agent, or Firm—David A. Roth

[57] ABSTRACT

A flame retardant polymer composition comprises a major amount of a poly (1, 3 imidazolidine-2, 4, 5 trione) which has the following structure:

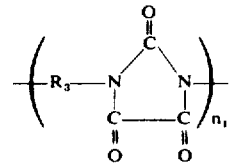

where $n_1$ is an integer $>10$ and where $R_3$ is a hydrocarbon or substituted hydrocarbon group and a minor but effective amount of a compound selected from the group consisting of phosphonates and phosphates having the following structure:

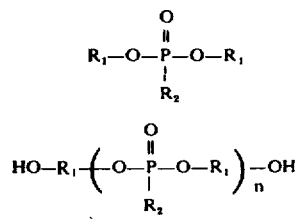

and $$(R-O)_3 P = O$$

where
R is an aryl or a halogenated aryl group as exemplified but not limited by

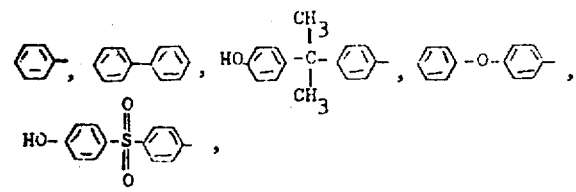

and halogenated derivatives thereof;
$R_1$ is a halogenated aryl group comprised of the same aryl groups as listed for R;
$R_2$ is a phenyl group;
$n$ is an integer equal to or greater than 1.

6 Claims, No Drawings

FLAME RETARDANT POLYMER COMPOSITION

CROSS-REFERENCES TO RELATED APPLICATIONS

This is a continuation of application Ser. No. 284,321 filed Aug. 28, 1972, now abandoned.

This application is related to Ser. No. 29,657 filed Apr. 17, 1970, now U.S. Pat. No. 3,661,859.

BACKGROUND OF THE INVENTION

1. Field of the Invention

The present invention is directed to a flame-retardant polymer composition. More particularly, the invention is directed to a composition comprised of poly (1, 3- imidazolidine -2, 4, 5-triones) and phosphonates or phosphates which resist burning. In its more specific aspects, the invention is concerned with a polymer composition of the aforementioned polymers and halogenated phosphonates or phosphates.

2. Description of the Prior Art.

The use of phosphonates or phosphates as flame retardants for polymers and other flammable materials is well known. For example, flame retardants have been added to polyolefins. However, it has been found that ordinarily large amounts of flame retardants must be added to the usual polymer before any great resistance to flammability is conferred thereto. This, not only is expensive but also detracts from the quality of the polymer, especially when it is in the form of a film.

It has now been found that the flame retardance of poly (1, 3-imidazolidine triones), especially in film form, may be rendered flame retardant by addition thereto of halogenated phosphonates or phosphates in small amounts as compared to the amounts usually employed for other polymers.

The following prior art was considered relative to this invention:

U.S. Pat. Nos. 3,576,793, 3,560,432, 3,557,053, 3,549,480, 3,547,878, 3,544,509, 3,539,531, 3,530,083, 3,489,722, 3,471,427, 3,468,980, 3,463,837, 3,412,070, 3,421,052, 3,349,150, 3,329,651, 3,194,795, 3,162,610, 3,145,177, 3,115,466, 3,058,941, 3,020,306, 3,020,256, 3,014,954, 3,014,951, 3,014,956, 3,014,944, 2,999,823, 2,959,568, 2,934,507, 2,877,204, 2,856,369, 2,739,952, 2,627,521, 2,516,168, 3,547,897, 3,591,562, 3,239,482, 3,609,113

*Chemical & Engineering News*, Oct. 18, 1971, page 16; and *Modern Plastics*, June, 1971, pages 50–51.

SUMMARY OF THE INVENTION

The present invention may be briefly described and summarized as involving a flame retardant polymer composition of a major amount of a polymer which is characterized by repeating units which contain 1, 3 -imidazolidine -2, 4, 5 - trione - 1, 3 diyl ring and an organic moiety, $R_3$, which may be aromatic, aliphatic, alicyclic, these same groups which are substituted, and mixtures thereof. Examples of, but not limited to, such groups are:

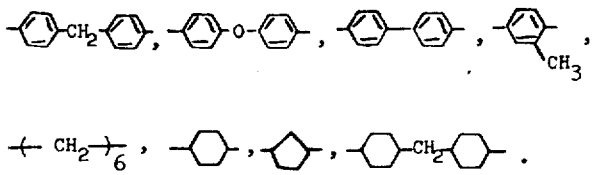

These polymers will be referred to generically as poly (1, 3 - imidazolidine - 2, 4, 5 - triones) and a minor but effective amount of a phosphonate, polyphosphonate prepared from mono- and difunctional phenols or certain phosphates. The polymer may be a solid at room temperature and may contain in each repeating unit the 1, 3, -imidazolidine - 2, 4, 5 trione 1, 3-diyl ring while the phosphonates or phosphates have either one of the following structures:

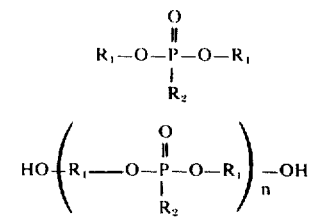

and

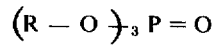

where
- R is an aryl or a halogenated aryl group as defined before;
- $R_1$ is an aryl or a halogenated aryl group as defined before;
- $R_2$ is a phenyl group;
- n is an integer equal to or greater than 1.

VARIABLES OF THE INVENTION

The polymer of the present invention is a poly (1, 3 - imidazolidine - 2, 4, 5 - trione) which contains the 1, 3, -imidazolidine -2, 4, 5 -trione - 1, 3, - diyl ring of the structure:

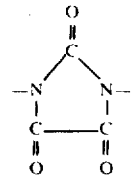

These polymers are described in allowed Ser. No. 29,657; U.S. 3,591,562; and U.S. 3,609,113 all of which are incorporated herein by reference.

As examples of such polymers may be mentioned:

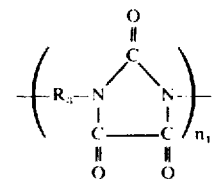

where $R_3$ is as defined before such as but not limited to:

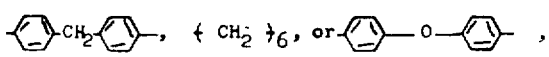

or mixture thereof and $n_1$ is an integer >10.

The halogenated mono aryl group is preferably brominated aryl, but chlorinated aryl or iodine substituted mono aryl may be used. When the chlorine or iodine substitute mono aryl is employed, more of the phosphonate or phosphate may be required than when the bromine substituted mono aryl is used. For example, with the brominated mono aryl, the phosphonate or phosphate may be employed within the range from about 2.5% to about 15% by weight, preferably about 2.5% to about 10.0% by weight, whereas with the other halogens as substituents, the amount of phosphonate or phosphate in the flame retardant composition may be in the upper part of the range, say from about 10% to about 15% by weight.

In preparing the Class I and II phosphonates, a mixed Friedel Crafts Catalyst or a weak Lewis acid may be used as illustrated in the examples which follow.

The flame retardance of certain polymers may be improved by the incorporation of aromatic phosphonates or phosphates described in Class I, Class II, and Class III. Further improvement in flame retardance may be possible by combination or mixtures of the phosphonates and phosphates described below with each other and with other known flame retardants as shown in the prior art.

Unusually low levels of the phosphates and phosphonates described below give unexpected improvement in the flame retardance of imidazolidinetrione polymers and of paramount importance, the phosphates and phosphonates are compatible with imidazolidinetrione polymers and thus do not embrittle film made therefrom.

The phosphonates described in Class I or Class II are prepared by the reaction of a halogenated mono- or difunctional phenol with dichlorophenyl phosphine oxide. The phosphates described in Class III are prepared by reacting mono- or diphenols with phosphorous pentachloride.

Class I. Phosphonates prepared from monofunctional phenols.

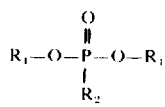

where
R₁ is an aryl or halogenated aryl group as defined before,
R₂ is a phenyl group.

Example: Bis(2,4, 6-tribromophenyl) phenylphosphonate

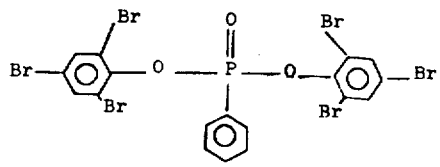

Class II. Phosphonates and Polyphosphonates prepared from difunctional phenols

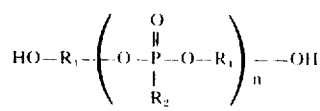

where
R₁ is an aryl or halogenated aryl group as defined before;
R₂ is a phenyl group;
n is an integer equal to or greater than 1.

Example: Poly ]oxy(2,6-dibromo-1,4-phenylene) isopropylidene-(2,6-dibromo-1,4-phenylene) (phenyl phosphonylidene)]

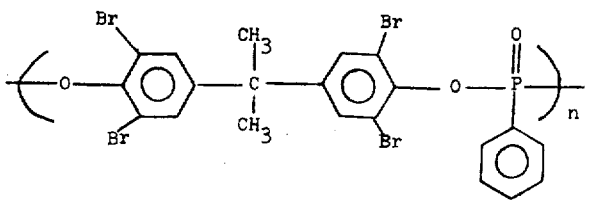

Class III. $(R - O)_3 P = O$
where
R is an aryl or halogenated aryl group as defined before.

The following examples illustrate, but do not limit, this invention.

EXAMPLE I

In a flask equipped with a condenser and an addition funnel, 70.0 grams of 2,4,6-tribromophenol (0.211 moles) and 1.0 grams of magnesium chloride (0.0105 moles) were dissolved in 40 milliliters of diphenyl ether at 135° C. under a nitrogen atmosphere. After the catalyst had dissolved, 19.5 grams of dichlorophenyl phosphine oxide (0.100 moles) were added dropwise. The diphenyl ether solution was heated at 160° C. for 16 hours under a stream of nitrogen. After the reaction had cooled to room temperature, the bis (2, 4, 6-tribromophenyl) phenylphosphonate was precipitated by adding the diphenyl ether solution to 400 milliliters of 5% diethyl ether in hexane. The precipitate, after washing with hexane and then with methanol, yielded 62.1 grams (79.2%).

EXAMPLE II

In a resin pot equipped with a condenser, an overhead stirrer, and an addition funnel, 857.2 grams of 2,4,6-tribromophenol (2.59 moles) and 5.0 grams of magnesium chloride (0.0525 moles) were melted at 115° C. under a nitrogen atmosphere. To the melt, 250 grams of dichlorophenylphosphine oxide (1.28 moles) were added dropwise over a period of 25 minutes. The melt was stirred and heated at 175° for 17 hours under a stream of nitrogen to remove the hydrogen chloride evolved. After cooling the melt to 130° C., the reaction flask was placed under a vacuum and heated to 175° C. for an additional 21 hours. Sublimed phenol, which collected in the top of the resin pot, was removed. The yield of the bis(2,4,6-tribromophenyl) phenylphosphonate was 963 grams (95.8%).

EXAMPLE III

Using the same procedure used in Example I, 30.0 grams of pentabromophenol (0.0613 moles) and 0.50 grams of magnesium chloride (0.00525 moles) were suspended in 40 milliliters of diphenyl ether. After the suspension was heated to 105° C., 5.85 grams of dichlorophenylphosphine oxide (0.030 moles) were added dropwise. The suspension was heated to 180° C. over a period of 18 hours and worked up by the procedure used in Example I to yield 30.7 grams (93.0%) of bis (pentabromophenyl) phenylphosphonate.

EXAMPLE IV

Using the same procedure used in Example II, 56.6 grams of 4,4'-isopropylidenebis(3,5-dibromophenol)

(0.100 moles) were heated to 185°C. To the unmelted solids, 9.75 grams of dichlorophenylphosphine oxide (0.05 moles) were added dropwise to give a dough-like material. This material was heated to 215°C. for 6 hours under a stream of nitrogen and then worked up by the procedure used in Example I to yield 60.0 grams (95.7%) of poly [oxy(2,6-dibromo-1,4-phenylene)isopropylidene-(3,5-dibromo-1,4-phenylene)(phenyl phosphonylidene)].

EXAMPLE V

Using the same procedure used in Example I, 202.4 grams of 4,4'-sulfonylbis(3,5-dibromophenol) (0.372 moles) and 2.0 grams of stannous chloride (0.0105 moles) were dissolved in 500 milliliters of diphenyl ether under a nitrogen atmosphere. To this solution, 74.0 grams of dichlorophenylphosphine oxide (0.380 moles) were added dropwise. The combined solution was heated 24 hours at 235° C. and 24 hours at 220° under a nitrogen stream. The final 24 hours at 235° C. were conducted under a vacuum. After cooling, the diphenyl ether solution was precipitated into methanol to yield 202 grams (81.6%) of the compound having the structure shown in the table which follows.

EXAMPLE VI

Using the same procedure as in Example I, 74.0 grams of dichlorophenyl phosphine oxide (0.38 moles) were reacted with 202.4 grams of 4,4'-isopropylidene bis (3,5-dibromophenol) (0.37 mols) in 500 milliliters of phenyl ether using 2.0 gms. of stannous chloride as catalyst. After 72 hours at 220° C. the product was precipitated and recovered by pouring reaction mixture in methanol and filtering. The yield was 202 grams corresponding to an 82% yield. The structure of the polymeric phosphonate is:

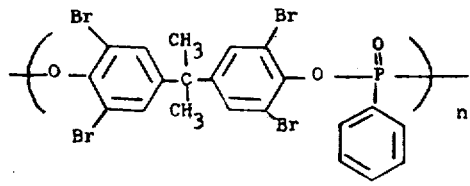

EXAMPLE VII

To a stirred flask equipped with a condenser were added 17 grams (0.1 mols) of p-phenyl phenol, 5.4 grams (0.026 mols) of phosphorous pentachloride and 75 cc of carbon tetrachloride. A slow stream of N₂ was used as a purge to remove the HCl from the flask and into a caustic scrubber containing phenolphthalein and an amount of NaOH equivalent to the theoretical amount of HCl that would be liberated by complete reaction. The temperature was gradually raised to 77° C. and after four hours all caustic in the caustic scrubber was neutralized. After cooling to room temperature, water was introduced continuously into the flask while stirring vigorously until hydrolysis was complete as shown by the neutrality of the water. The product was a white precipitate suspended in the water phase. This was recovered and weighed 13.3 grams corresponding to a 92% yield based on phosphorous pentachloride. The structure of the phosphate is:

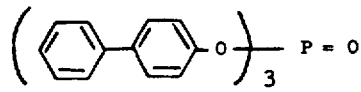

EXAMPLE VIII

Fifty grams of 2,4,6, tribromophenol (0.15 mols), 8.3 grams of phosphorous pentachloride (0.04 mols) and 90 cc of carbon tetrachloride were put into a stirred flask fitted with a reflux condenser and having an N₂ purge into a caustic scrubber as described in Example VII. The temperature was gradually raised to 70° C. After six hours the caustic scrubber was neutralized indicating complete reaction. The product was hydrolyzed and recovered as described in Example VII. The yield was 39.2 grams of white product corresponding to 95% of theoretical based on phosphorous pentachloride. The structure of the phosphate is:

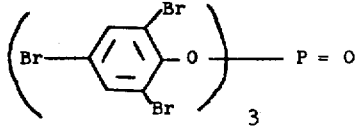

The table below shows the flame retardant properties of the above compounds in thin films (2.8 to 3.8 mils) of poly(4, 4' -methylene-diphenyl-1,3-imidazolidine-2,4,5 trione). The films were prepared by dissolving the polymer and a low percentage of flame retardant (2.5 to 10.0%) in dimethyl sulfoxide. The films were then solution cast, dried and cut into 6 by 4 inch strips for testing. A standard oxygen index test ASTM D-2863-70 was used to determine the effectiveness of flame retardants. The following results were obtained and are to be compared to a 20.7 oxygen index for base polymer without any additives.

| Example No. | Formula for Flame Retardant | Weight Percent Flame Retardant | Oxygen Index Percent |
|---|---|---|---|
| I & II | Br—⌬(Br,Br)—O—P(=O)(C₆H₅)—O—⌬(Br,Br)—Br | 2.5<br>5.0<br>10.0 | 26.7<br>36.0<br>47.5 |
| III | Br—⌬(Br,Br,Br)—O—P(=O)(C₆H₅)—O—⌬(Br,Br,Br)—Br | 2.5 | 26.4 |
| IV | (HO—⌬(Br,Br)—C(CH₃)₂—⌬(Br)—O—)₂P(=O)(C₆H₅) | 2.5 | 26.1 |

—Continued

| Example No. | Formula for Flame Retardant | Weight Percent Flame Retardant | Oxygen Index Percent |
|---|---|---|---|
| V | 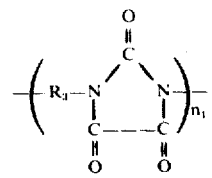 | 2.5 | 32.2 |
| VI | | Incompatible Brittle Film | — |
| VII | | 5.0 | 24.0 |
| | | 10.0 | 29.0 |
| VIII | | 7.5 | 27.3 |

Besides the phosphonates and phosphates illustrated, other phosphonates and phosphates which are useful are those where R and $R_1$ are

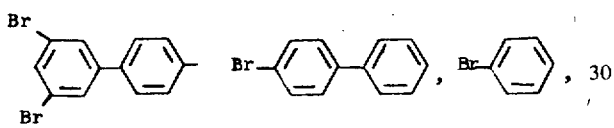

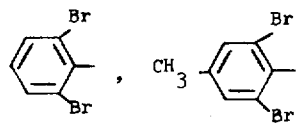

The oxygen index is a well known test for determining the flammability of plastics and is a standard method of test ASTM Designation D-2863-70. A high oxygen index indicates a greater resistance to flammability.

It will be clear from the data in Example V that as little as 2.5% by weight of the several phosphonates and 5.0% of the phosphates increased the oxygen index to over 24, whereas 5.0 and 10.0% by weight increased the oxygen index of the phosphonate containing film to 36.0 and 47.5. Similar results are obtained with the phosphates. This may be compared with the base polymer of 20.7 oxygen index and the fact that the flame retardant compositions of the present invention do not require high loading of the particular phosphonates or phosphate used on the particular polymer. In the Modern Plastics article supra, polyolefins required additive loadings up to 30% to achieve the desired degree of flame retardancy.

Thus, the present invention is new, useful and unobvious.

The nature and objects of the present invention having been fully described and illustrated and the best mode and embodiment contemplated set forth, what we wish to claim as new and useful and secure by Letters Patent is:

1. A flame retardant composition comprising:
   A major amount of a polymer selected from the group of poly (1,3-imidazolidine-2,4,5-triones) having the following structure:

$$\left( R_3 - N \underset{\underset{O}{\overset{\|}{C}} - \underset{O}{\overset{\|}{C}}}{\overset{\overset{O}{\|}}{C}} N \right)_{n_1}$$

where $n_1 > 10$ and $R_3$ = a hydrocarbon or substituted hydrocarbon group and a minor amount effective to improve the flame retardancy of said polymer, but insufficient to cause embrittling of said polymer, of

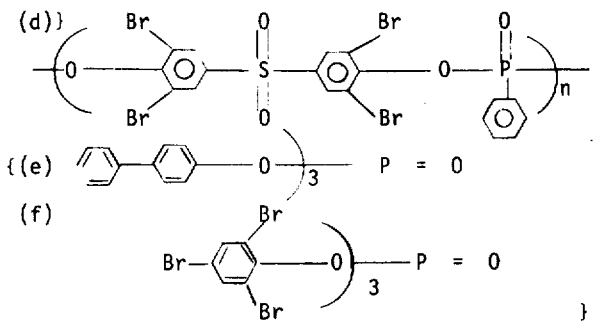

wherein $n$ is an integer equal to or greater than 1, which is poly oxy(2,6-dibromo-1,4 - phenylene) - sulfonyl (2, 6 - dibromo-1, 4 - phenylene) (phenyl phosphonylidene) when $n$ is greater than 1.

2. A composition in accordance with claim 1 in which the compound is in an amount from 2.5% to about 10.0% by weight.

3. A composition in accordance with claim 1 in which the $R_3$ group in the polymer is 4,4'-diphenyl methane.

4. A composition according to claim 1 which is in the shape of a film.

5. A composition according to claim 1 wherein said polymer and said compound are soluble in the same solvents.

6. A composition according to claim 4 in which said film has been formed by casting a solution of said polymer and said compound.

* * * * *

UNITED STATES PATENT OFFICE
CERTIFICATE OF CORRECTION

Patent No. 3,701,847     Dated October 31, 1972

Inventor(s) Sakae Miyauchi et al.

It is certified that error appears in the above-identified patent and that said Letters Patent are hereby corrected as shown below:

After the listing of the inventors insert
--Assignee: Nihon Denshi Kabushiki Kaisha --.

Signed and sealed this 1st day of May 1973.

(SEAL)
Attest:

EDWARD M. FLETCHER, JR.            ROBERT GOTTSCHALK
Attesting Officer                  Commissioner of Patents